United States Patent
Price et al.

(10) Patent No.: US 11,563,908 B2
(45) Date of Patent: Jan. 24, 2023

(54) IMAGE ACQUISITION TECHNIQUES WITH REDUCED NOISE USING SINGLE PHOTON AVALANCHE DIODES

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 31 days.

(21) Appl. No.: 17/181,962

(22) Filed: Feb. 22, 2021

(65) Prior Publication Data
US 2022/0272286 A1 Aug. 25, 2022

(51) Int. Cl.
*G06T 5/00* (2006.01)
*H04N 5/357* (2011.01)
*H04N 5/353* (2011.01)
*H04N 5/378* (2011.01)

(52) U.S. Cl.
CPC ............. *H04N 5/357* (2013.01); *G06T 5/003* (2013.01); *H04N 5/353* (2013.01); *H04N 5/378* (2013.01); *G06T 2207/20201* (2013.01)

(58) Field of Classification Search
None
See application file for complete search history.

(56) References Cited

U.S. PATENT DOCUMENTS

| 10,116,925 | B1 * | 10/2018 | Wang | H04N 5/37455 |
| 2015/0163429 | A1 * | 6/2015 | Dai | H04N 5/3535 |
| | | | | 348/295 |
| 2017/0343921 | A1 * | 11/2017 | Yamaguchi | G03G 15/043 |
| 2020/0036918 | A1 | 1/2020 | Ingle et al. | |
| 2020/0106973 | A1 | 4/2020 | Zhang et al. | |
| 2020/0296307 | A1 * | 9/2020 | Ogawa | H04N 5/37455 |

OTHER PUBLICATIONS

Dutton, et al., "High Dynamic Range Imaging at the Quantum Limit with Single Photon Avalanche Diode-Based Image Sensors", in Journal of Sensors, vol. 18, Issue 4, Apr. 11, 2018, 16 Pages.
"International Search Report and Written Opionion issued in PCT Application No. PCT/US2022/013780", dated Apr. 4, 2022, 10 Pages.

* cited by examiner

Primary Examiner — Mark T Monk
(74) *Attorney, Agent, or Firm* — Workman Nydegger

(57) ABSTRACT

A system for image acquisition with reduced noise using SPADs is configured to perform a plurality of sequential exposure and readout operations. Each exposure and readout operation includes (i) applying a set of shutter operations to configure each SPAD pixel of the SPAD array to enable photon detection, and (ii) for each SPAD pixel of the SPAD array, reading out a number of photons detected during the set of shutter operations. The system is also configured to generate an image based on the number of photons detected for each SPAD pixel during each of the plurality of sequential exposure and readout operations.

14 Claims, 11 Drawing Sheets

700

702 — Performing A Plurality Of Sequential Exposure And Readout Operations, Each Exposure And Readout Operation Comprising: (i) Applying A Set Of Shutter Operations To Configure Each SPAD Pixel Of The SPAD Array To Enable Photon Detection, And (ii) For Each SPAD Pixel Of The SPAD Array, Reading Out A Number Of Photons Detected During The Set Of Shutter Operations 704 — Generating An Image Based On The Number Of Photons Detected For Each SPAD Pixel During Each Of The Plurality Of Sequential Exposure And Readout Operations 706 — Performing Consecutive Pluralities Of Sequential Exposure And Readout Operations 708 — Generating Consecutive Images, Each Consecutive Image Being Generated Based On A Respective Plurality Of Sequential Exposure And Readout Operations Of The Consecutive Pluralities Of Sequential Exposure And Readout Operations 710 — Consecutively Displaying The Consecutive Images On A Display

FIG. 7

IMAGE ACQUISITION TECHNIQUES WITH REDUCED NOISE USING SINGLE PHOTON AVALANCHE DIODES

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR systems include one or more cameras and utilize images and/or depth information obtained using the camera(s) to provide pass-through views of a user's environment to the user. An MR system may provide pass-through views in various ways. For example, an MR system may present raw images captured by the camera(s) of the MR system to a user. In other instances, an MR system may modify and/or reproject captured image data to correspond to the perspective of a user's eye to generate pass-through views. An MR system may modify and/or reproject captured image data to generate a pass-through view using depth information for the captured environment obtained by the MR system (e.g., using a depth system of the MR system, such as a time-of-flight camera, a rangefinder, stereoscopic depth cameras, etc.). In some instances, an MR system utilizes one or more predefined depth values to generate pass-through views (e.g., by performing planar reprojection).

In some instances, pass-through views generated by modifying and/or reprojecting captured image data may at least partially correct for differences in perspective brought about by the physical separation between a user's eyes and the camera(s) of the MR system (known as the "parallax problem," "parallax error," or, simply "parallax"). Such pass-through views/images may be referred to as "parallax-corrected pass-through" views/images. By way of illustration, parallax-corrected pass-through images may appear to a user as though they were captured by cameras that are co-located with the user's eyes.

A pass-through view can aid users in avoiding disorientation and/or safety hazards when transitioning into and/or navigating within a mixed-reality environment. Pass-through views may also enhance user views in low visibility environments. For example, mixed-reality systems configured with long wavelength thermal imaging cameras may facilitate visibility in smoke, haze, fog, and/or dust. Likewise, mixed-reality systems configured with low light imaging cameras facilitate visibility in dark environments where the ambient light level is below the level required for human vision.

To facilitate imaging of an environment for generating a pass-through view, some MR systems include image sensors that utilize complementary metal-oxide-semiconductor (CMOS) and/or charge-coupled device (CCD) technology. For example, such technologies may include image sensing pixel arrays where each pixel is configured to generate electron-hole pairs in response to detected photons. The electrons may become stored in per-pixel capacitors, and the charge stored in the capacitors may be read out to provide image data (e.g., by converting the stored charge to a voltage).

However, such image sensors suffer from a number of shortcomings. For example, the signal to noise ratio for a conventional image sensor may be highly affected by read noise, especially when imaging under low visibility conditions. For instance, under low light imaging conditions (e.g., where ambient light is below about 10 lux, such as within a range of about 1 millilux or below), a CMOS or CCD imaging pixel may detect only a small number of photons, which may cause the read noise to approach or exceed the signal detected by the imaging pixel and decrease the signal-to-noise ratio.

The dominance of read noise in a signal detected by a CMOS or CCD image sensor is often exacerbated when imaging at a high framerate under low light conditions. Although a lower framerate may be used to allow a CMOS or CCD sensor to detect enough photons to allow the signal to avoid being dominated by read noise, utilizing a low framerate often leads to motion blur in captured images. Motion blur is especially problematic when imaging is performed on an HMD or other device that undergoes regular motion during use.

In addition to affecting pass-through imaging, the read noise and/or motion blur associated with conventional image sensors may also affect other operations performed by HMDs, such as late stage reprojection, rolling shutter corrections, object tracking (e.g., hand tracking), surface reconstruction, semantic labeling, 3D reconstruction of objects, and/or others.

Thus, for at least the foregoing reasons, there is an ongoing need and desire for improved image acquisition techniques that reduced noise and that mitigate motion blur.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed to systems, methods and devices for image acquisition with reduced noise using single photon avalanche diodes (SPADs).

Some embodiments include a system comprising a SPAD array that has a plurality of SPAD pixels. The system includes one or more processors and one or more hardware storage devices storing instructions that are executable by the one or more processors to configure the system to perform various acts. The system is configured to perform a plurality of sequential exposure and readout operations. Each exposure and readout operation includes (i) applying a set of shutter operations to configure each SPAD pixel of the SPAD array to enable photon detection, and (ii) for each SPAD pixel of the SPAD array, reading out a number of photons detected during the set of shutter operations. The system is also configured to generate an image based on the number of photons detected for each SPAD pixel during each of the plurality of sequential exposure and readout operations.

In some embodiments, the system is configured to perform a plurality of sequential shutter operations to configure each SPAD pixel of the SPAD array to enable photon detection. The system is also configurable to access a respective stream of binary counts for each SPAD pixel of the SPAD array. Each respective stream of binary counts indicates, for a respective SPAD pixel, a number of photons detected during the plurality of sequential shutter operations. The system is also configured to identify a set of binary counts from the respective streams of binary counts for each SPAD pixel. The set of binary counts includes a respective set of binary counts from each respective stream of binary counts for each SPAD pixel. The system is also configured to generate an image using the set of binary counts.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 7 and 8 illustrate example flow diagrams depicting acts associated with image acquisition with reduced noise using SPADs.

DETAILED DESCRIPTION

Figure 1:
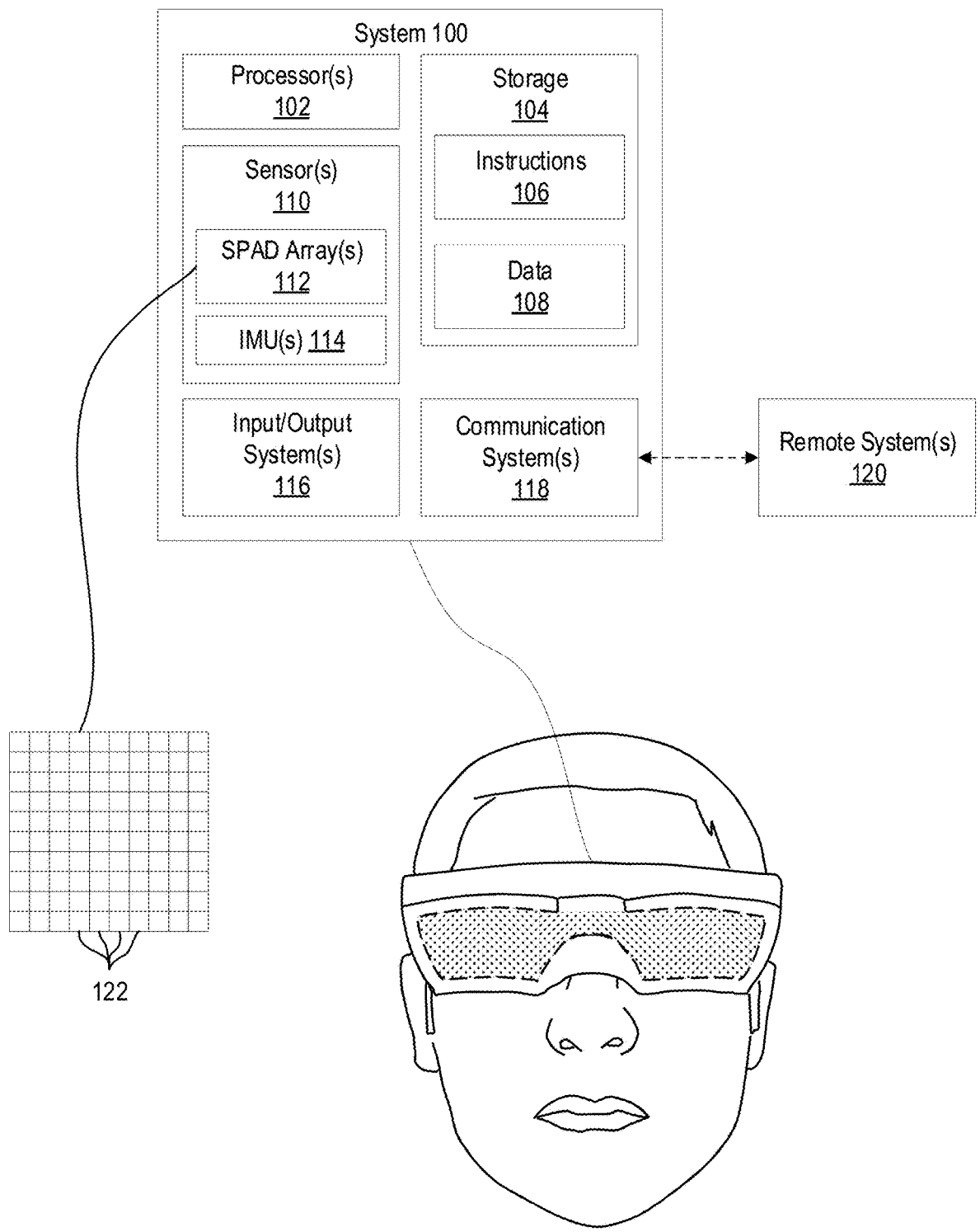
FIG. 1 illustrates example components of an example system that may include or be used to implement one or more disclosed embodiments.

Disclosed embodiments are generally directed to systems, methods, and devices that facilitate image acquisition with reduced noise using single photon avalanche diodes (SPADs).

Examples of Technical Benefits, Improvements, and Practical Applications

Those skilled in the art will recognize, in view of the present disclosure, that at least some of the disclosed embodiments may be implemented to address various shortcomings associated with at least some conventional image acquisition techniques. The following section outlines some example improvements and/or practical applications provided by the disclosed embodiments. It will be appreciated, however, that the following are examples only and that the embodiments described herein are in no way limited to the example improvements discussed herein.

In contrast with conventional CMOS or CCD sensors, a SPAD is operated at a bias voltage that enables the SPAD to detect a single photon. Upon detecting a single photon, an electron-hole pair is formed, and the electron is accelerated across a high electric field, causing avalanche multiplication (e.g., generating additional electron-hole pairs). Thus, each detected photon may trigger an avalanche event. A SPAD may operate in a gated manner (each gate corresponding to a separate shutter operation), where each gated shutter operation may be configured to result in a binary output. The binary output may comprise a "1" where an avalanche event was detected during an exposure (e.g., where a photon was detected), or a "0" where no avalanche event was detected.

Separate shutter operations may be integrated over a frame capture time period. The binary output of the shutter operations over a frame capture time period may be counted, and an intensity value may be calculated based on the counted binary output.

An array of SPADs may form an image sensor, with each SPAD forming a separate pixel in the SPAD array. To capture an image of an environment, each SPAD pixel may detect avalanche events and provide binary output for consecutive shutter operations in the manner described herein. The per-pixel binary output of multiple shutter operations over a frame capture time period may be counted, and per-pixel intensity values may be calculated based on the counted per-pixel binary output. The per-pixel intensity values may be used to form an intensity image of an environment.

The use of SPAD image sensors for image capture as described herein may provide a number of advantages over conventional systems and techniques for image capture, particularly for imaging under low light conditions and/or for imaging from devices that undergo motion during image capture (e.g., HMDs).

Initially, the binarization of the SPAD signal effectively eliminates read noise, thereby improving signal-to-noise ratio for SPAD image sensor arrays as compared with conventional CMOS and/or CCD sensors. Accordingly, because of the binarization of SPAD signal, a SPAD signal may be read out at a high framerate (e.g., 90 Hz or greater, such as 120 Hz or even 240 Hz) without causing the signal to be dominated by read noise, even for signals capturing a low number of photons under low light environments.

In view of the foregoing, multiple exposure and readout operations may be performed at a high framerate using a SPAD array to generate separate partial image frames, and the separate partial image frames may be combined to form a single composite image. In contrast, attempting to perform multiple exposure and readout operations at a high framerate to form a single composite image using a conventional CMOS or CCD camera would result in signals dominated by read noise, particularly under low light imaging conditions.

By utilizing multiple exposure and readout operations of a SPAD array to form a single composite image, low light imaging at high frame rate is made possible. Furthermore, utilizing a high frame rate for low light image capture (e.g., by utilizing multiple shorter exposures) can reduce the effects of motion artifacts. In addition, the techniques described herein for high frame rate image capture using SPADs may be combined with other motion compensation operations (e.g., computer vision-based techniques, IMU-based or motion-based techniques) to reduce motion artifacts even further. Mitigated motion artifacts may accordingly improve other operations performed by HMDs, such as late stage reprojection, rolling shutter artifact correction, etc.

Having just described some of the various high-level features and benefits of the disclosed embodiments, attention will now be directed to FIGS. 1 through 8. These Figures illustrate various conceptual representations, architectures, methods, and supporting illustrations related to the disclosed embodiments.

Example Systems and Techniques for Image Acquisition with Reduced Noise Using SPADs Attention is now directed to FIG. 1, which illustrates an example system 100 that may include or be used to implement one or more disclosed embodiments. FIG. 1 depicts the system 100 as a head-mounted display (HMD) configured for placement over a head of a user to display virtual content for viewing by the user's eyes. Such an HMD may comprise an augmented reality (AR) system, a virtual reality (VR) system, and/or any other type of HMD. Although the present disclosure focuses, in at least some respects, on a system 100 implemented as an HMD, it should be noted that the techniques described herein for utilizing SPAD arrays may be implemented using other types of systems/devices, without limitation.

FIG. 1 illustrates various example components of the system 100. For example, FIG. 1 illustrates an implementation in which the system includes processor(s) 102, storage 104, sensor(s) 110, I/O system(s) 116, and communication system(s) 118. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions associated with imaging using SPAD arrays. The actions may rely at least in part on data 108 (e.g., avalanche event counting or tracking, etc.) stored on storage 104 in a volatile or non-volatile manner.

In some instances, the actions may rely at least in part on communication system(s) 118 for receiving data from remote system(s) 120, which may include, for example, separate systems or computing devices, sensors, and/or others. The communications system(s) 120 may comprise any combination of software or hardware components that are operable to facilitate communication between on-system components/devices and/or with off-system components/devices. For example, the communications system(s) 120 may comprise ports, buses, or other physical connection apparatuses for communicating with other devices/components. Additionally, or alternatively, the communications system(s) 120 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable phenomenon. By way of non-limiting example, the sensor(s) 110 may comprise one or more image sensors, microphones, thermometers, barometers, magnetometers, accelerometers, gyroscopes, and/or others.

FIG. 1 also illustrates that the sensor(s) 110 include SPAD array(s) 112. As depicted in FIG. 1, a SPAD array 112 comprises an arrangement of SPAD pixels 122 that are each configured to facilitate avalanche events in response to sensing a photon, as described hereinabove. As will be described in more detail hereinafter, SPAD array(s) 112 may be implemented on a system 100 (e.g., an MR HMD) to facilitate various image capture functions associated with high-framerate imaging.

FIG. 1 also illustrates that the sensor(s) 110 include inertial measurement unit(s) 114 (IMU(s) 114). IMU(s) 114 may comprise any number of accelerometers, gyroscopes, and/or magnetometers to capture motion data associated with the system 100 as the system moves within physical space.

Furthermore, FIG. 1 illustrates that a system 100 may comprise or be in communication with I/O system(s) 116. I/O system(s) 116 may include any type of input or output device such as, by way of non-limiting example, a touch screen, a mouse, a keyboard, a controller, and/or others, without limitation. For example, the I/O system(s) 116 may include a display system that may comprise any number of display panels, optics, laser scanning display assemblies, and/or other components. In some instances, a SPAD array 112 may be configured with a resolution of SPAD pixels 122 that matches a pixel resolution of a display system, which may facilitate high-fidelity pass-through imaging.

Figure 2A:
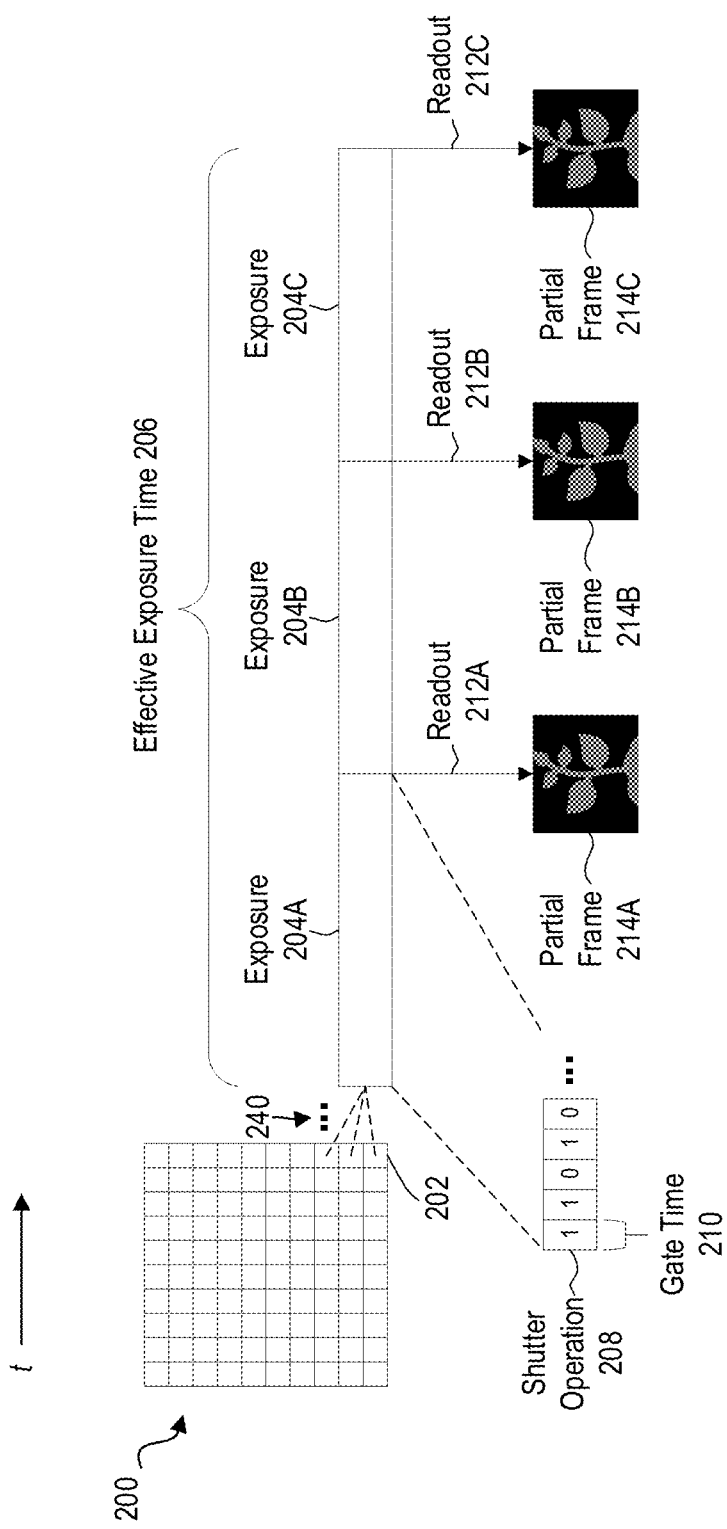
FIGS. 2A-2C illustrate example exposure and readout operations that may be performed using a single photon avalanche diode (SPAD) array to capture an image.
Figure 2B:
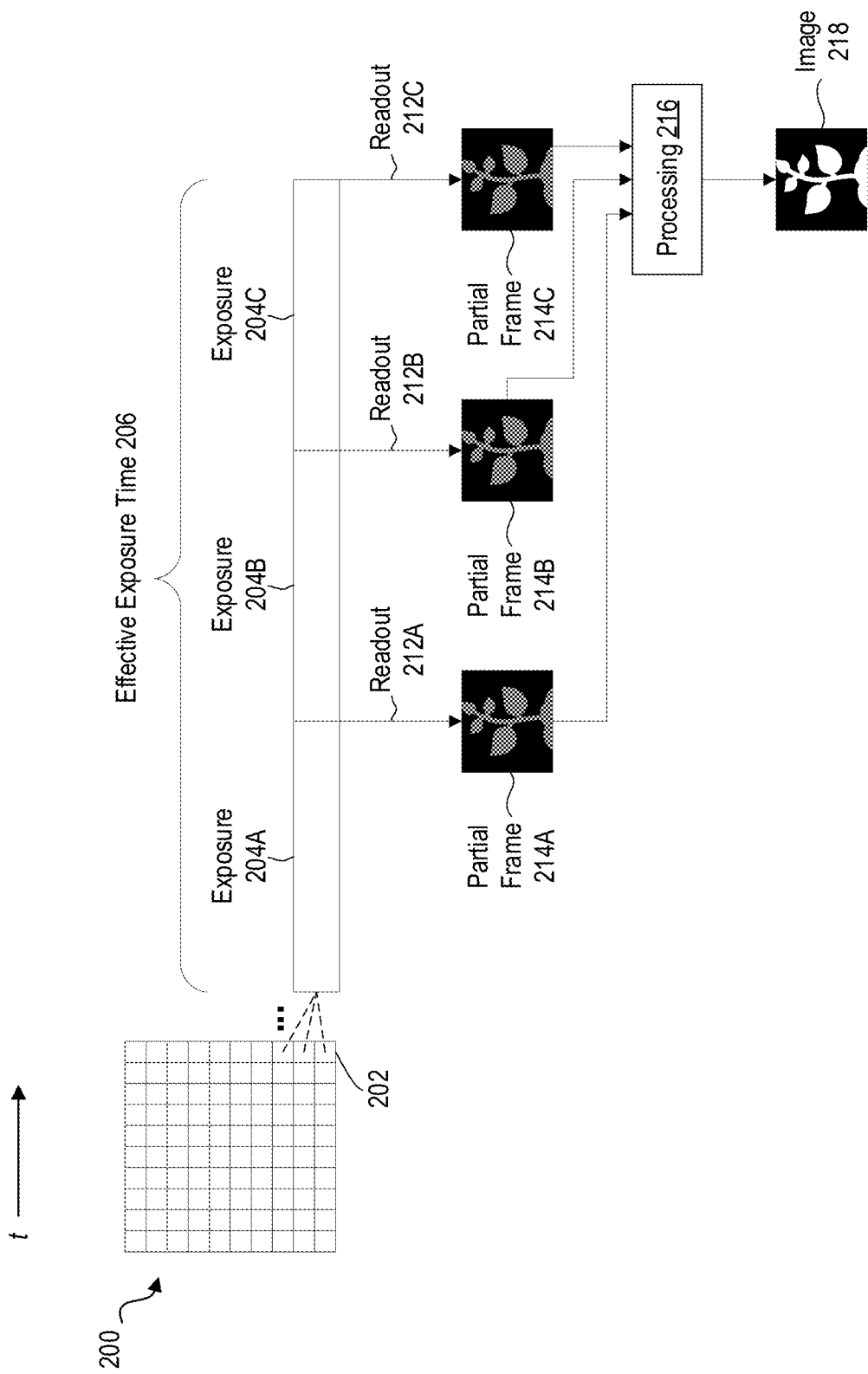
Figure 2C:
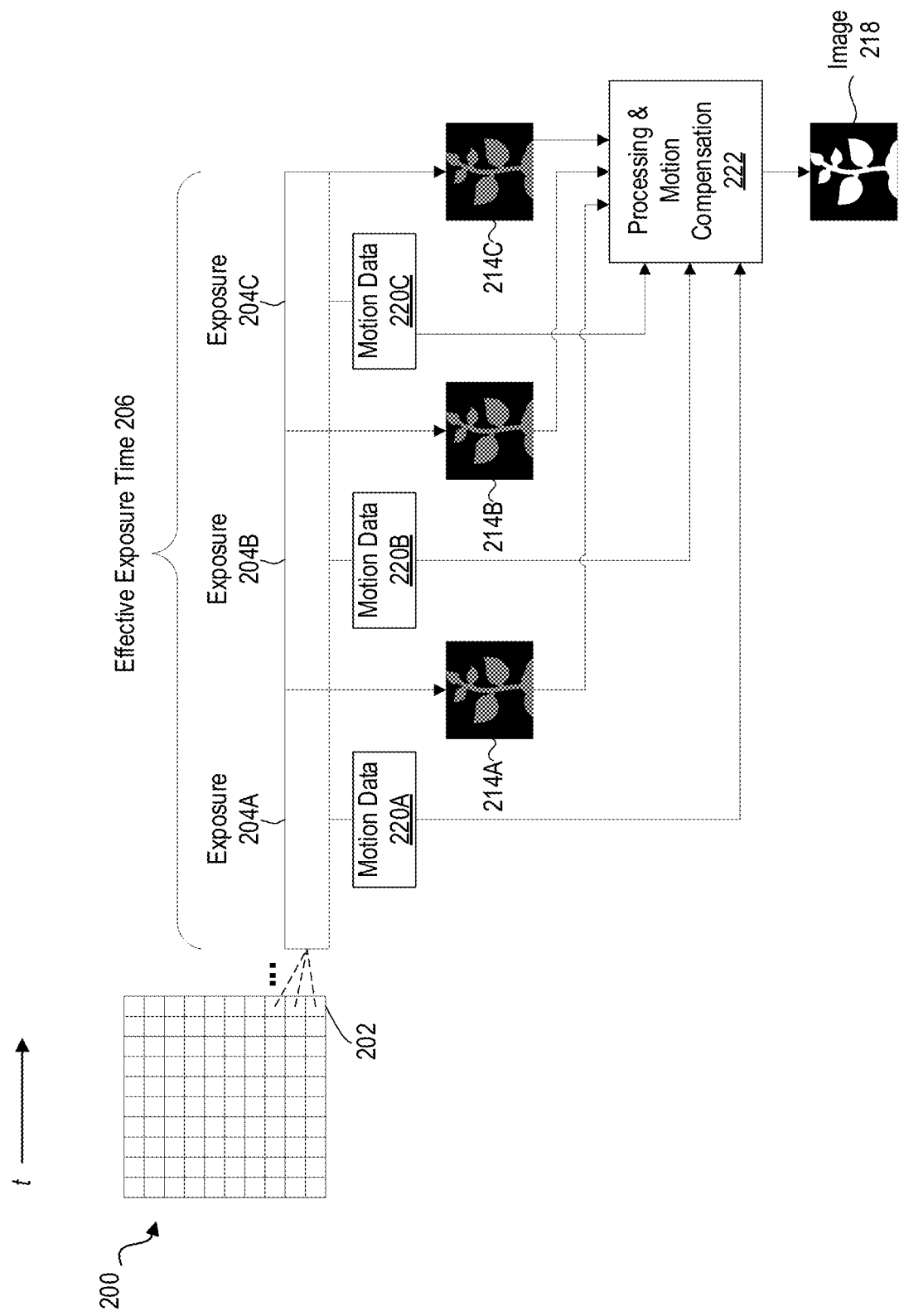

FIGS. 2A-2C illustrate example exposure and readout operations that may be performed using a single photon avalanche diode (SPAD) array to capture an image. In particular, FIG. 2A illustrates a SPAD array 200, which may correspond to the SPAD array(s) 112 described hereinabove with reference to FIG. 1. In this regard, a SPAD pixel 202 of the SPAD array is configurable to trigger avalanche events in response to detecting photons. The SPAD pixel 202 may be operated in a controlled, gated manner to facilitate different exposure operations for image acquisition.

FIG. 2A illustrates dashed lines and ellipsis 240 between SPAD pixels and representations of exposure and readout operations that will be described in more detail hereafter. The dashed lines and ellipsis 240 indicate that the exposure and readout operations described hereafter may be performed using any number of the SPAD pixels of the SPAD array 200 (e.g., all SPAD pixels). A single instance of the exposure and readout operations is shown in FIG. 2A for the sake of clarity and simplicity. FIG. 2A additionally provides a time axis t to illustrate the temporal relationship among the different exposure and readout operations that will be described hereinafter.

FIG. 2A shows that, to facilitate image acquisition, SPAD pixels of a SPAD array are configured to perform multiple sequential exposure and readout operations. In particular, FIG. 2A shows exposure 204A and readout 212A, which are followed by exposure 204B and readout 212B, which are in turn followed by exposure 204C and readout 212C. FIG. 2A depicts (by dashed lines extending downward from exposure 204A) that an exposure operation includes applying a set of shutter operations 208. As noted above, applying a shutter operation to a SPAD pixel configures the SPAD pixel to trigger avalanche events in response to detected photons. Thus, the presence of an avalanche event during a shutter operation indicates that the SPAD pixel detected a photon during the shutter operation. Whether a SPAD pixel experienced an avalanche event (and therefore detected a photon) during a shutter operation may be represented by a binary "1" or "0", with "1" indicating that an avalanche event occurred during the shutter operation and with "0" indicating that no avalanche event occurred during the shutter operation. Accordingly, FIG. 2A depicts each shutter operation 208 in association with a binary "1" or "0."

FIG. 2A also depicts that the individual shutter operations 210 are performed over a particular gate time 212. The gate time 212 is the duration over which a SPAD pixel becomes configured to trigger an avalanche event in response to a detected photon. Although FIG. 2A only explicitly depicts the set of shutter operations 208 associated with exposure 204A, a corresponding second set of shutter operations is applied to facilitate the other exposures 204B and 204C. As will be described in more detail hereafter, the results of the exposures 204A, 204B, and 204C may be combined for forming a final image.

FIG. 2A shows that, in some instances, respective partial frames are generated from separate exposures. In particular, FIG. 2A illustrates readout 212A being performed after exposure 204A, readout 212B being performed after exposure 204B, and readout 212C being performed after exposure 204C. For a SPAD array, a "readout" comprises determining or outputting a number of photons detected over a set of shutter operations on a per-pixel basis. Pixels capturing brighter portions of a captured environment will have counted a greater number of photons than pixels capturing darker portions of the captured environment. The per-pixel number of photons detected over the set of shutter operations may therefore be used to form an intensity image.

Accordingly, FIG. 2A shows a partial frame 214A formed based on the readout 212A from performing the exposure 204A, a partial frame 214B formed based on the readout 212B from performing the exposure 204B. The partial frames 214A, 214B, and 214C conceptually represent a captured scene that includes a plant in a low light environment. The plant is partially exposed in each of the partial frames 214A, 214B, and 214C and therefore appears dim and faint therein. This is because the partial frames 214A, 214B, and 214C are each formed based on respective exposures 204A, 204B, and 204C that, when considered individually, span a relatively short exposure time for detecting a sufficient number of photons for low light imaging. For instance, when imaging at 90 Hz, the individual exposures 204A, 204B, and 204C may each span a respective time period of about 11 ms, which may be insufficient to appropriately expose the plant when imaging the plant under low light conditions (e.g., about 10 lux or below).

Although the individual exposures 204A, 204B, and 204C may, when considered individually, do not cover a long enough exposure time period to appropriately expose the plant, the exposures 204A, 204B, and 204C, when considered in combination, cover an effective exposure time 206 that is longer and may appropriately expose the plant. Continuing with the above example, where the respective exposure time period of the individual exposures 204A, 204B, and 204C is about 11 ms, the effective exposure time 206 may comprise about 33 ms or more, which may be sufficient to appropriately expose the plant under low light imaging conditions.

Therefore, the partial frames 214A, 214B, and 214C (formed from reading out the respective exposures 204A, 204B, and 204C that span the effective exposure time 206) may be combined to generate a composite image. Objects represented in the composite image will appears as having been exposed over the entire effective exposure time 206, even though the objects were exposed according to separate, consecutive exposure and readout operations that are individually shorter than the effective exposure time 206.

FIG. 2B shows processing 216 being performed to combine the partial frames 214A, 214B, and 214C to form an image 218. FIG. 2B shows the image 218 as depicting an appropriately exposed (e.g., more brightly illuminated) representation of the plant imaged under low light conditions. Image 218 thus comprises a low light image. As noted above, the consecutively performed exposure and readout operations (exposure 204A and readout 212A, exposure 204B and readout 212B, exposure 204C and readout 212C) are performed in a manner that avoids read noise (e.g., using SPAD array 200). Because the consecutively performed exposure and readout operations can be performed while avoiding read noise, the exposure and readout operations may be performed at a high frame rate (e.g., 90 Hz or greater). Accordingly, because the image 218 is generated using components (e.g., partial frames 214A, 214B, and 214C formed from the consecutively performed exposure and readout operations) that are captured at a high frame rate but that still collectively span an effective exposure time 206, the image 218 may provide an appropriately exposed representation of low light environments with reduced motion blur (e.g., as compared to situations where a single, unbroken long exposure operation is performed to generate a single long exposure low light image frame).

Although the present example focuses on three separate consecutive exposure and readout operations (exposure 204A and readout 212A, exposure 204B and readout 212B, exposure 204C and readout 212C) being performed to generate the image 218, one will appreciate, in view of the present disclosure, that any number of sequential exposure and readout operations may be performed to generate a composite image in accordance with the present disclosure. Furthermore, in the present example, each of the exposure and readout operations are performed over a same exposure time (e.g., as distinct from high dynamic range imaging exposures), but different relative exposure times as between exposure and readout operations may be performed in some instances.

In some implementations, additional actions may be performed to further mitigate or reduce motion blur in a captured composite image. For example, in some instances, a system performs a motion compensation operation to generate a composite image, in combination with the techniques described above of utilizing sequential, high-framerate exposure and readout operations.

FIG. 2C illustrates an example motion compensation operation that is based on motion data (e.g., obtained via IMU(s) 114). In particular, FIG. 2C illustrates motion data 220A associated with the exposure 204A, motion data 220B associated with the exposure 204B, and motion data 220C associated with the exposure 204C. The various motion data are, in some instances, captured by an IMU 114 during the performance of the various exposure operations described hereinabove. For example, the IMU 114 may capture motion data 220A during the exposure 204A. The motion data 220A may represent one or more average or median motion metrics during the exposure 204A. The IMU 114 may also capture motion data 220B during the exposure 204B. The motion data 220B may represent one or more average or median motion metrics during the exposure operation 204B (e.g., a measured change in position relative to a position represented by the motion data 220A). Similarly, the IMU 114 may also capture motion data 220C during the exposure 204C. The motion data 220C may represent one or more average or median motion metrics during the exposure 204C (e.g., a measured change in position relative to a position represented by the motion data 220B).

The motion data associated with the various exposure operations may therefore be associated with the different partial frames generated based on the various exposure operations. For example, in on example, motion data 220A is associated with partial frame 214A, motion data 220B is associated with partial frame 214B, and motion data 220C is associated with partial frame 214C. In this way, the motion data 220A, 220B, and 220C may be used to compensate for movement of the SPAD array 200 between the capturing of partial frames 214A, 214B, and 214C to align the partial frames 214A, 214B, and 214C for generating a composite image. Thus, FIG. 2C illustrates processing and motion compensation 222 that uses the motion data 220A, 220B, and 220C and the associated partial frames 214A, 214B, and 214C to generate the image 218.

In some instances, a motion compensation operation for generating the image additionally or alternatively utilizes computer vision-based motion compensation techniques. For example, in some implementations, a motion compensation operation may include global or local downsampling, alignment, and upsampling operations to reduce motion artifacts in a composite image (e.g., image 218).

Figure 3:
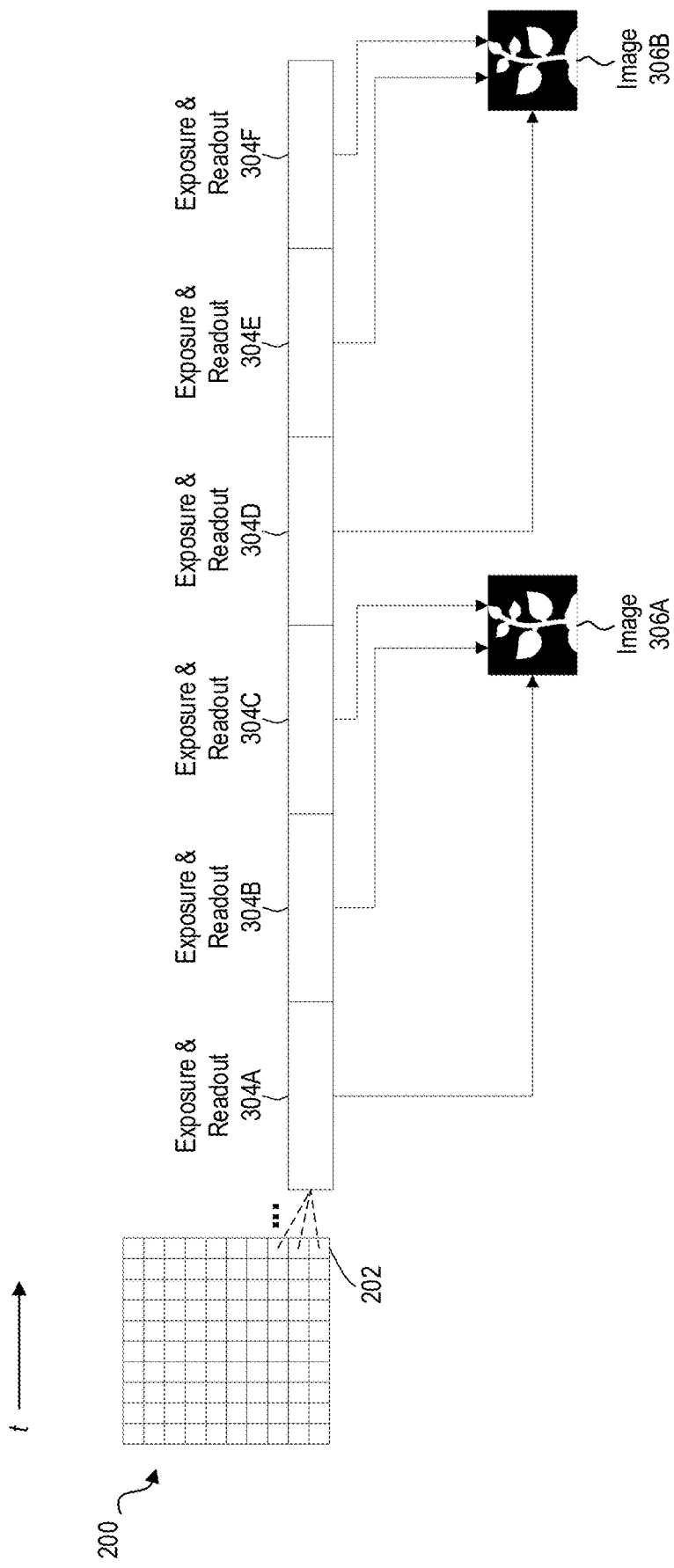
FIGS. 3 and 4 illustrate examples of capturing consecutive images using a SPAD array.
Figure 4:
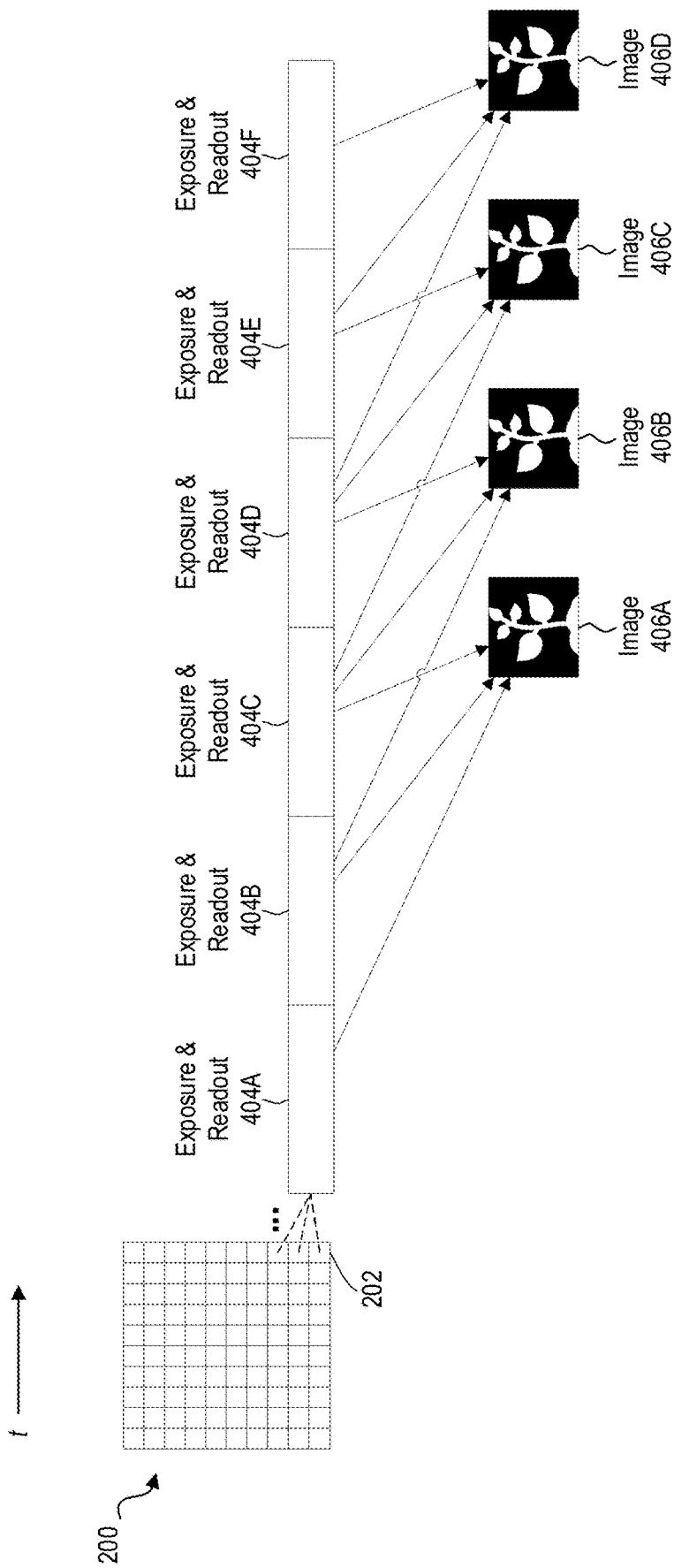

FIGS. 3 and 4 illustrate examples of capturing consecutive low light images using a SPAD array. As an example implementation, consecutive low light images may be captured using one or more SPAD arrays of an HMD and may be used to generate pass-through images of a captured low light environment for presentation to a user of the HMD in real-time.

FIG. 3 illustrates various exposure and readout operations being performed using the SPAD array 200. In particular, FIG. 3 shows exposure and readout operations 304A through 304F performed sequentially. FIG. 3 furthermore illustrates that the consecutive exposure and readout operations 304A, 304B, and 304C may be used to generate an image 306A using techniques similar to those described hereinabove with reference to FIGS. 2A-2C (e.g., as indicated via arrows extending from the exposure and readout operations 304A, 304B, and 304C to the image 306A). FIG. 3 omits details related to generating partial frames, processing, motion compensation, etc. for clarity).

FIG. 3 further illustrates an example implementation in which consecutive exposure and readout operations 304D, 304E, and 304F are performed subsequent to the exposure and readout operations 304A, 304B, and 304C. Image 306B is formed temporally subsequent to image 306A and, similar to image 306A, is formed based on the exposure and readout operations 304D, 304E, and 304F (e.g., as indicated via arrows extending from the exposure and readout operations 304A, 304B, and 304C to the image 306A). In this regard, a system may consecutively generate low light (or other) images at a desirable framerate (e.g., 30 fps or greater) for various purposes (e.g., for video pass-through presentation on a display to a user of an HMD).

The example illustrated in FIG. 3 shows each image 306A and 306B being generated using separate sets of exposure and readout operations. For instance, image 306A is generated using exposure and readout operations 304A, 304B, and 304C, whereas image 306B is generated using a separate, non-overlapping set of exposure and readout operations 304D, 304E, and 304F. Separate sets of sequential exposure and readout operations may be performed at any desirable rate. For example, a first set of exposure and readout operations may include exposure and readout operations 304A, 304B, and 304C, and a second set of exposure and readout operations may include exposure and readout operations 304D, 304E, and 304F. A system may perform consecutive sets of 3 exposure and readout operations such that the sets are completed at a rate of 30 Hz or lower (or higher).

FIG. 4 illustrates an additional implementation of generating consecutive low-light images. Similar to FIG. 3, FIG. 4 shows exposure and readout operations 404A through 404F performed sequentially. Similar to image 306A of FIG. 3, FIG. 4 illustrates that exposure and readout operations 404A, 404B, and 404C may be used to generate an image 406A using techniques similar to those described hereinabove with reference to FIGS. 2A-2C (e.g., as indicated via arrows extending from the exposure and readout operations 404A, 404B, and 404C to the image 406A).

FIG. 4 additionally shows that, in some instances, a single exposure and readout operation is used to form multiple composite images. By way of example, FIG. 4 shows that the image 406B is formed based on exposure and readout operations 404B, 404C, and 404D (via arrows). FIG. 4 furthermore shows that image 406C is formed based on exposure and readout operations 404C, 404D, and 404E. FIG. 4 also depicts image 406D being formed based on exposure and readout operations 404D, 404E, and 404F. Accordingly, FIG. 4 demonstrates that exposure and readout operation 404B may be used to generate both image 406A and image 406B, and that exposure and readout operation 404C may be used to generate images 406A, 406B, and 406C. Similarly, FIG. 4 shows that exposure and readout operation 404D may be used to generate images 406B, 406C, and 406D. FIG. 4 furthermore shows that exposure and readout operation 404E may be used to form both image 406C and image 406D.

In view of the foregoing, images may be formed using overlapping sets of exposure and readout operations. For instance, image 406A is formed using a first set of exposure and readout operations that includes exposure and readout operations 404A, 404B, and 404C, while image 406B is formed using a second set of exposure and readout operations that includes exposure and readout operations 404B, 404C, and 404D. Thus, the first and second sets of exposure and readout operations both include exposure and readout operations 404B and 404C and are therefore overlapping sets. Such functionality may advantageously facilitate a higher rate of consecutive image capture/generation. For example, using the approach shown in FIG. 4, images may be generated at the same rate that consecutive exposure and readout operations are performed (e.g., 30 Hz, 60 Hz, 90 Hz, 120 Hz, 240 Hz, etc.). In this way, a frame display rate for displaying generated images may also match the rate that consecutive exposure and readout operations are performed (e.g., for displaying pass-through images on an HMD).

Figure 5:
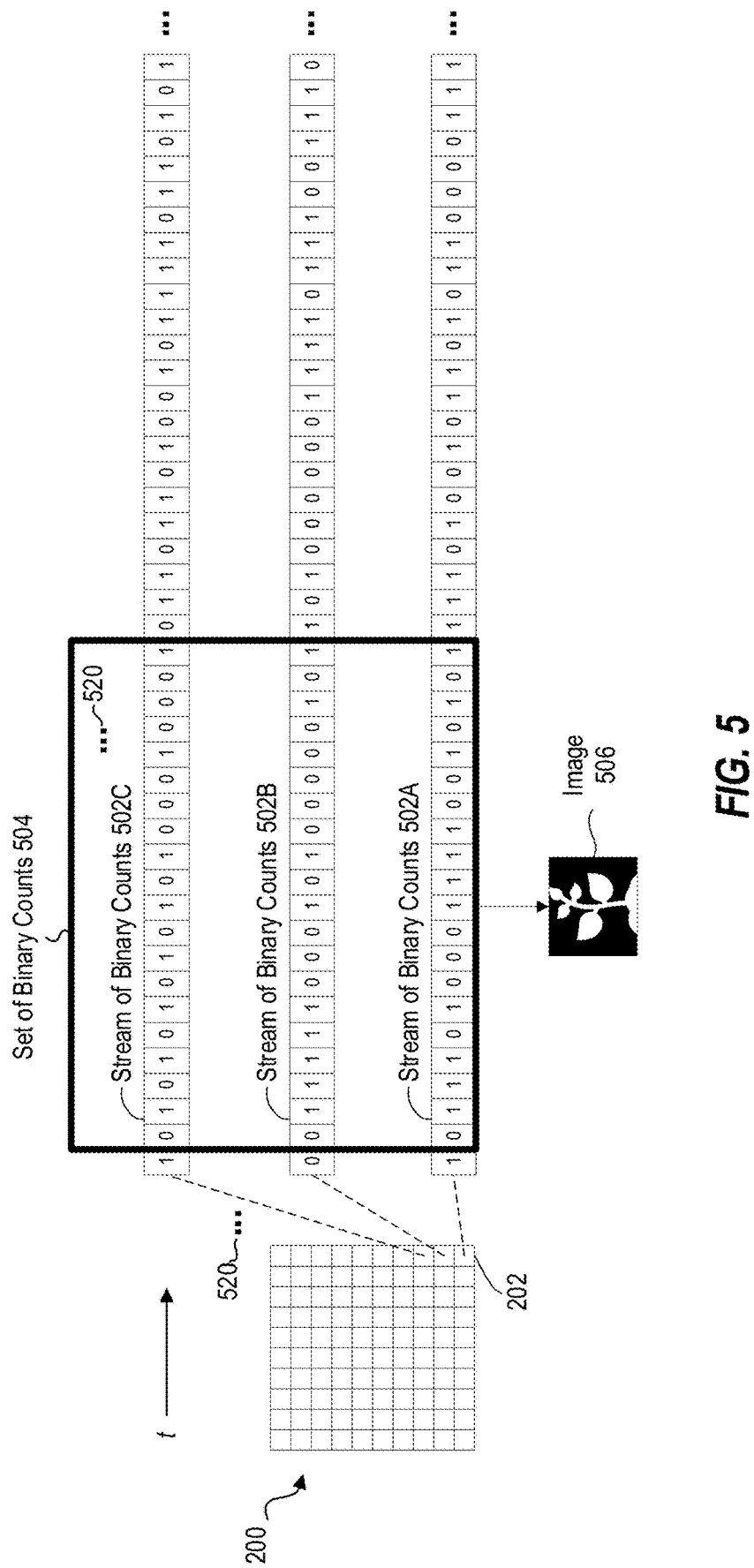
FIG. 5 illustrates example streams of binary counts that may be obtained using a SPAD array to generate an image.

In accordance with the present disclosure, alternative techniques may be employed to facilitate high-framerate image capture with reduced noise using SPAD arrays. For example, FIG. 5 illustrates example streams of binary counts 502A, 502B, and 502C that may be obtained using SPAD pixels of the SPAD array 200 and may be used to generate an image. FIG. 5 illustrates dashed lines extending from various SPAD pixels of the SPAD array 200 toward corresponding streams of binary counts 502A, 502B, and 502C. The ellipses 520 indicate that any number of SPAD pixels may be associated with a corresponding stream of binary counts. Only a few streams of binary counts are shown in FIG. 5 for clarity and simplicity.

As indicated above, a stream of binary counts 502A, 502B, or 502C results from performing sequential shutter operations on a SPAD pixel of a SPAD array 200 to configure the SPAD pixel for triggering avalanche events in response to detected photons. Whether a SPAD pixel experienced an avalanche event (and therefore detected a photon) during a shutter operation may be represented by a binary "1" or "0", with "1" indicating that an avalanche event occurred during the shutter operation and with "0" indicating that no avalanche event occurred during the shutter operation. In some instances, per-pixel streams of binary counts are accumulated/stored on one or more system-on-a-chip (SOC) devices.

Thus, the streams of binary counts 502A, 502B, and 502C for each SPAD pixel indicate whether each SPAD pixel detected a photon during a corresponding shutter operation. Furthermore, a section of binary counts of a stream of binary counts indicates a number of photons detected during shutter operations performed within a corresponding period of time. FIG. 5 illustrates a set of binary counts 504, which is illustrated to include a respective section (or respective set) of binary counts from each per-pixel stream of binary counts 502A, 502B, 502C and so on. In this way, a set of binary counts 504 may indicate, over a particular time period, a number of photons detected by each SPAD pixel of the SPAD array 200. As noted above, per-pixel numbers of detected photons may be used to determine per-pixel intensity values for forming an image. Thus, FIG. 5 illustrates image 506 being formed based on the set of binary counts 504 described above.

The use of streams of binary counts to generate images advantageously provides a system with a broad degree of flexibility in image generation using SPAD arrays. For example, a system may identify separate sets of binary counts from streams of binary counts to generate separate images in various ways.

Figure 6A:
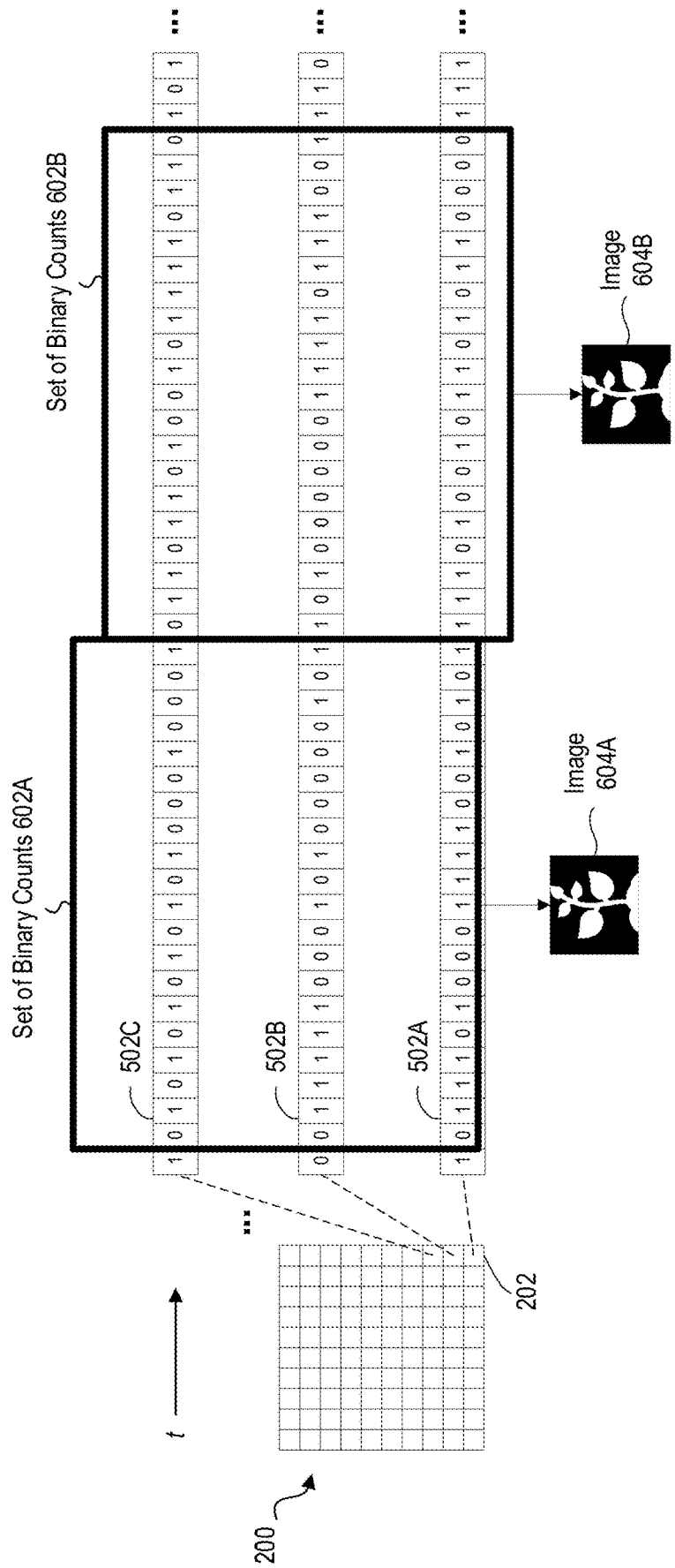
FIGS. 6A and 6B illustrate example approaches for generating consecutive images using streams of binary counts obtained using a SPAD array.
Figure 6B:
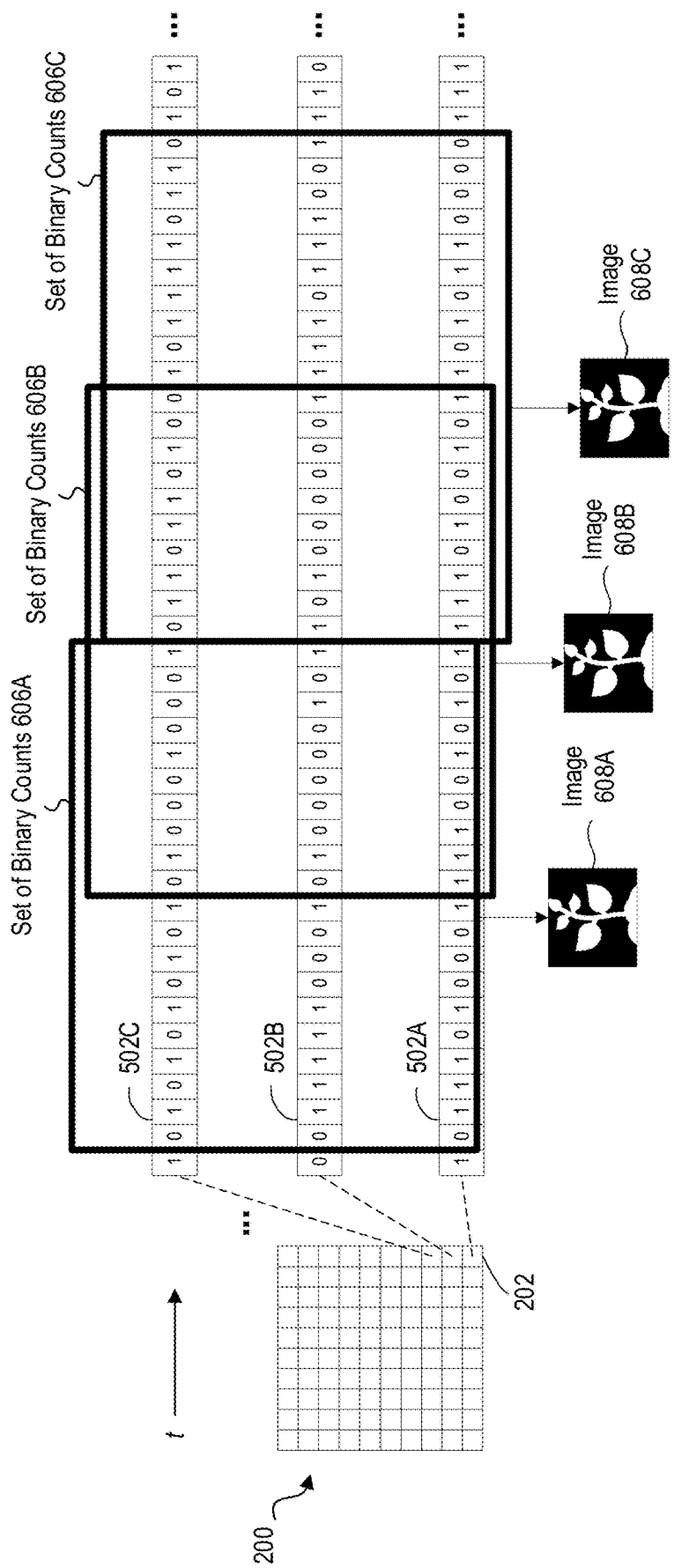

FIGS. 6A and 6B illustrate example approaches for generating consecutive images using streams of binary counts obtained using a SPAD array. FIG. 6A illustrates a first set of binary counts 602A and a second set of binary counts 602B identified from the per-pixel streams of binary counts 502A, 502B, 502C, etc. The first and second sets of binary counts 602A and 602B are shown in FIG. 6A as vertically offset from one another for ease of differentiation. FIG. 6A shows that the first set of binary counts 602A is used to generate a first image 604A, while the second set of binary counts 602B is used to generate a temporally subsequent second image 604B (via arrows).

In the example shown in FIG. 6A, the first and second sets of binary counts 602A and 602B are non-overlapping sets, meaning that no particular binary counts of the per-pixel streams of binary counts 502A, 502B, 502C are part of both sets of binary counts 602A and 602B. Furthermore, FIG. 6A conceptually depicts the first and second sets of binary counts 602A and 602B as having a same number of binary counts from the per-pixel streams of binary counts. In some instances, different sets of binary counts include different numbers of binary counts.

FIG. 6B illustrates an additional approach for generating consecutive images using per-pixel streams of binary counts. In particular, FIG. 6B shows a first set of binary counts 606A, a second set of binary counts 606B, and a third set of binary counts 606C. The first, second, and third sets of binary counts 606A, 606B, and 606C are shown in FIG. 6B as vertically offset from one another for ease of differentiation. FIG. 6B shows that the first set of binary counts 606A is used to generate a first image 608A, the second set of binary counts 606B is used to generate a second image 608B, and the third set of binary counts 606C is used to generate a third image 608C (via arrows).

In the example shown in FIG. 6B, the first and second sets of binary counts 606A and 606B are overlapping sets, meaning that at least some binary counts of the per-pixel streams of binary counts 502A, 502B, 502C are part of both sets of binary counts 606A and 606B. Similarly, FIG. 6A shows that the second and third sets of binary counts 606B and 606C are overlapping sets. In some instances, utilizing overlapping sets of binary counts to generate temporally consecutive images advantageously facilitates a higher rate of image capture/generation.

Although FIG. 6B does not illustrate the first and third sets of binary counts 606A and 606C as being overlapping, any number of sets of binary counts may be overlapping in accordance with the present disclosure. Furthermore, although FIG. 6B illustrates the various sets of binary counts being used to directly form the images, sets of binary counts may be used to form partial frames that are then in turn used to form final images (e.g., similar to the description of partial frames discussed above with reference to FIGS. 2A-2C).

Still furthermore, although motion compensation operations such as those described hereinabove with reference to FIG. 2C are not explicitly shown in FIG. 6A or 6B, motion compensation operations may be applied utilizing the techniques shown in FIGS. 6A and 6B to generate images. For example, respective motion data may be associated with different sets of binary counts or partial frames determined from sets of binary counts, and this motion data may be used to align partial frames or sets of binary counts for generating composite images.

Example Method(s) for Image Acquisition with Reduced Noise Using SPADs

The following discussion now refers to a number of methods and method acts that may be performed by the disclosed systems. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 8:
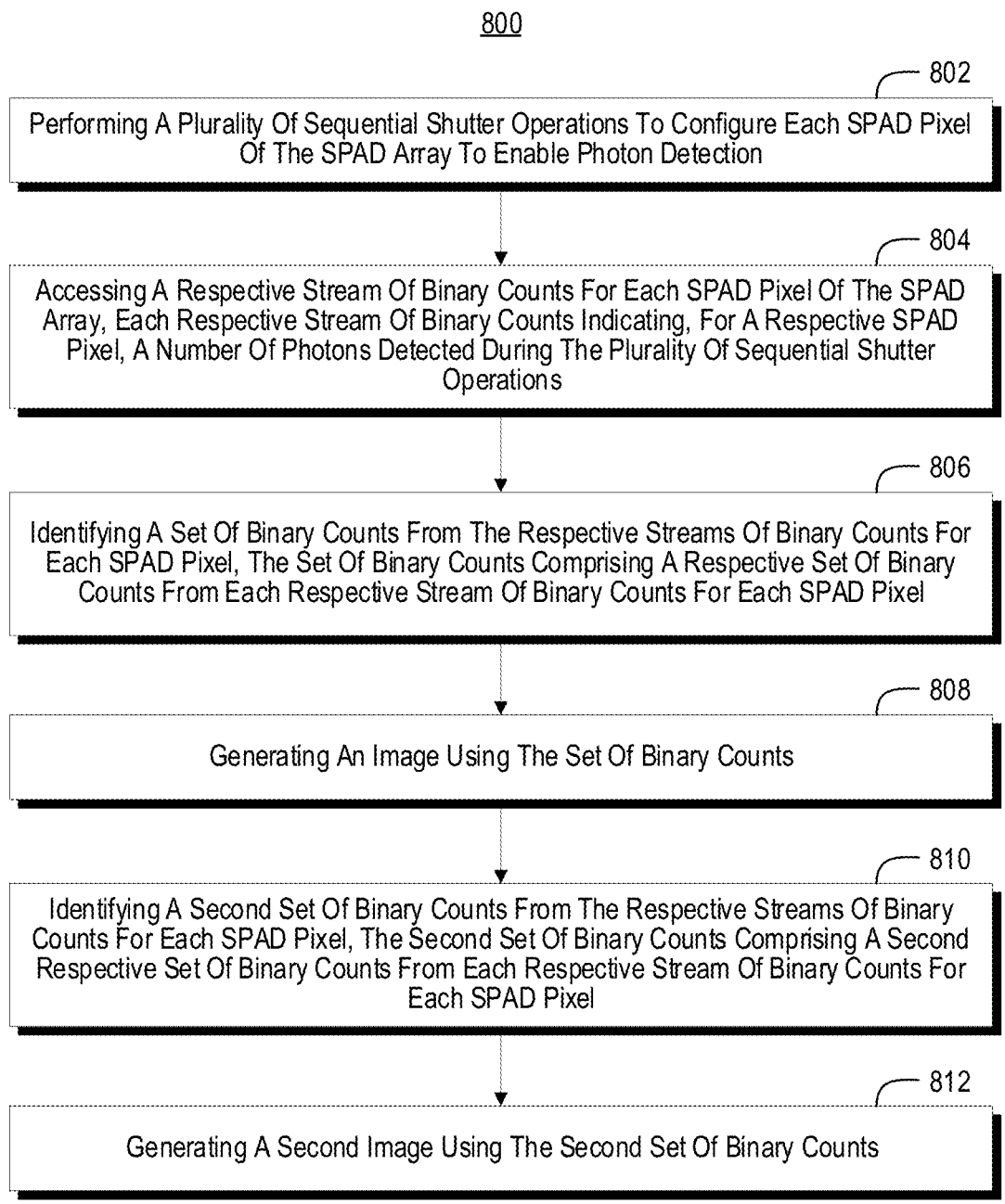

FIGS. 7 and 8 illustrate example flow diagrams 700 and 800, respectively, depicting acts associated with image acquisition with reduced noise using SPADs. The discussion of the various acts represented in the flow diagrams include references to various hardware components described in more detail with reference to FIG. 1.

Act 702 of flow diagram 700 includes performing a plurality of sequential exposure and readout operations, each exposure and readout operation comprising: (i) applying a set of shutter operations to configure each SPAD pixel of the SPAD array to enable photon detection, and (ii) for each SPAD pixel of the SPAD array, reading out a number of photons detected during the set of shutter operations. Act 702 is performed, in some instances, by a system 100 utilizing processor(s) 102, storage 104, sensor(s) 110, input/output system(s) 116, communication system(s) 118, and/or other components. In some instances, partial frames are generated for each separate exposure and readout operation. A plurality of sequential exposure and readout operations can include 2, 3, or more exposure and readout operations. In some instances, each sequential exposure and readout operation has a same exposure time. Furthermore, in some implementations, the sequential exposure and readout operations are performed over an effective exposure time period of about 33 ms or greater. Additionally, or alternatively, the sequential exposure and readout operations of the plurality of sequential exposure and readout operations are performed at a rate of 90 Hz or greater.

Act 704 of flow diagram 700 includes generating an image based on the number of photons detected for each SPAD pixel during each of the plurality of sequential exposure and readout operations. Act 704 is performed, in some instances, by a system 100 utilizing processor(s) 102, storage 104, sensor(s) 110, input/output system(s) 116, communication system(s) 118, and/or other components. In some instances, the image is generated using partial frames determined based on the number of photons detected for each SPAD pixel during each of the plurality of sequential exposure and readout operations. Furthermore, in some implementations, one or more motion compensation operations are performed to generate the image.

Act 706 of flow diagram 700 includes performing consecutive pluralities of sequential exposure and readout operations. Act 706 is performed, in some instances, by a system 100 utilizing processor(s) 102, storage 104, sensor(s) 110, input/output system(s) 116, communication system(s) 118, and/or other components. In some implementations, the consecutive pluralities of sequential exposure and readout operations include at least partially overlapping sets of sequential exposure and readout operations, whereas in other implementations, the consecutive pluralities of sequential exposure and readout operations comprise non-overlapping sets of sequential exposure and readout operations. In some embodiments, the consecutive pluralities of sequential exposure and readout operations are performed at a rate of 30 Hz or less.

Act 708 of flow diagram 700 includes generating consecutive images, each consecutive image being generated based on a respective plurality of sequential exposure and readout operations of the consecutive pluralities of sequential exposure and readout operations. Act 708 is performed, in some instances, by a system 100 utilizing processor(s) 102, storage 104, sensor(s) 110, input/output system(s) 116, communication system(s) 118, and/or other components.

Act 710 of flow diagram 700 includes consecutively displaying the consecutive images on a display. Act 710 is performed, in some instances, by a system 100 utilizing processor(s) 102, storage 104, sensor(s) 110, input/output system(s) 116, communication system(s) 118, and/or other components. In some instances, a frame display rate for displaying the consecutive images on the display matches a rate at which the sequential exposure and readout operations of the consecutive pluralities of sequential exposure and readout operations are performed.

Attention is now directed to FIG. 8, which illustrates flow diagram 800. Act 802 of flow diagram 800 includes performing a plurality of sequential shutter operations to configure each SPAD pixel of the SPAD array to enable photon detection. Act 802 is performed, in some instances, by a system 100 utilizing processor(s) 102, storage 104, sensor(s) 110, input/output system(s) 116, communication system(s) 118, and/or other components.

Act 804 of flow diagram 800 includes accessing a respective stream of binary counts for each SPAD pixel of the SPAD array, each respective stream of binary counts indicating, for a respective SPAD pixel, a number of photons detected during the plurality of sequential shutter operations. Act 804 is performed, in some instances, by a system 100 utilizing processor(s) 102, storage 104, sensor(s) 110, input/output system(s) 116, communication system(s) 118, and/or other components. In some instances, the respective streams of binary counts are accumulated on a system-on-a-chip (SOC) of a system (e.g., an MR HMD).

Act 806 of flow diagram 800 includes identifying a set of binary counts from the respective streams of binary counts for each SPAD pixel, the set of binary counts comprising a respective set of binary counts from each respective stream of binary counts for each SPAD pixel. Act 806 is performed, in some instances, by a system 100 utilizing processor(s) 102, storage 104, sensor(s) 110, input/output system(s) 116, communication system(s) 118, and/or other components.

Act 808 of flow diagram 800 includes generating an image using the set of binary counts. Act 808 is performed, in some instances, by a system 100 utilizing processor(s) 102, storage 104, sensor(s) 110, input/output system(s) 116, communication system(s) 118, and/or other components. In some instances, one or more motion compensation operations are applied as part of generating the image.

Act 810 of flow diagram 800 includes identifying a second set of binary counts from the respective streams of binary counts for each SPAD pixel, the second set of binary counts comprising a second respective set of binary counts from each respective stream of binary counts for each SPAD pixel. Act 810 is performed, in some instances, by a system 100 utilizing processor(s) 102, storage 104, sensor(s) 110, input/output system(s) 116, communication system(s) 118, and/or other components. In some instances, the second set of binary counts includes at least some binary counts from the respective streams of binary counts that are also included in the set of binary counts. Furthermore, in some instances, the second set of binary counts comprises a same number of binary counts as the set of binary counts.

Act 812 of flow diagram 800 includes generating a second image using the second set of binary counts. Act 812 is performed, in some instances, by a system 100 utilizing processor(s) 102, storage 104, sensor(s) 110, input/output system(s) 116, communication system(s) 118, and/or other components. The second image is generated/obtained subsequent to the image. Both the second image and the image may be consecutively displayed on a display of an HMD to facilitate pass-through imaging under low light conditions and with reduced motion blur (e.g., as compared with conventional approaches).

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for image acquisition with reduced noise using a single photon avalanche diode (SPAD) array, comprising:
    a SPAD array comprising a plurality of SPAD pixels;
    one or more processors; and
    one or more hardware storage devices storing instructions that are executable by the one or more processors to configure the system to:
        perform a plurality of sequential exposure and readout operations, each exposure and readout operation comprising:
            applying a set of shutter operations to configure each SPAD pixel of the SPAD array to enable photon detection; and
            for each SPAD pixel of the SPAD array, reading out a number of photons detected during the set of shutter operations;
        determine consecutive pluralities of sequential exposure and readout operations from the plurality of sequential exposure and readout operations, wherein the consecutive pluralities of sequential exposure and readout operations comprise at least partially overlapping sets of sequential exposure and readout operations from the plurality of sequential exposure and readout operations; and
        generate consecutive images using the consecutive pluralities of sequential exposure and readout operations, wherein each consecutive image is generated based on the number of photons detected for each SPAD pixel during a respective consecutive plurality of sequential exposure and readout operations of the consecutive pluralities of sequential exposure and readout operations.

2. The system of claim 1, wherein the plurality of sequential exposure and readout operations comprises three or more exposure and readout operations.

3. The system of claim 1, wherein each sequential exposure and readout operation comprises a same exposure time.

4. The system of claim 1, wherein the sequential exposure and readout operations are performed over an effective exposure time period of about 33 ms or greater.

5. The system of claim 1, wherein the instructions are executable by the one or more processors to further configure the system to perform the sequential exposure and readout operations of the plurality of sequential exposure and readout operations at a rate of 90 Hz or greater.

6. The system of claim 1, wherein the instructions are executable by the one or more processors to further configure the system to perform the consecutive pluralities of sequential exposure and readout operations at a rate of 30 Hz or less.

7. The system of claim 1, further comprising a display, and wherein the instructions are executable by the one or more processors to further configure the system to consecutively display the consecutive images on the display.

8. The system of claim 7, wherein a frame display rate for displaying the consecutive images on the display matches a rate at which the sequential exposure and readout operations of the consecutive pluralities of sequential exposure and readout operations are performed.

9. The system of claim 1, wherein the instructions are executable by the one or more processors to further configure the system to apply a motion compensation operation to generate the image.

10. A system for image acquisition with reduced noise using a single photon avalanche diode (SPAD) array, comprising:
    a SPAD array comprising a plurality of SPAD pixels;
    one or more processors; and
    one or more hardware storage devices storing instructions that are executable by the one or more processors to configure the system to:
        perform a plurality of sequential shutter operations to configure each SPAD pixel of the SPAD array to enable photon detection;
        access a respective stream of binary counts for each SPAD pixel of the SPAD array, each respective stream of binary counts indicating, for a respective SPAD pixel, a number of photons detected during the plurality of sequential shutter operations;
        identify a set of binary counts from the respective streams of binary counts for each SPAD pixel, the set of binary counts comprising a respective set of binary counts from each respective stream of binary counts for each SPAD pixel;
        identify a second set of binary counts from the respective streams of binary counts for each SPAD pixel, the second set of binary counts comprising a second respective set of binary counts from each respective stream of binary counts for each SPAD pixel, wherein the second set of binary counts comprises at least some binary counts from the respective streams of binary counts that are also included in the set of binary counts, the at least some binary counts being associated with a particular set of sequential shutter operations of the plurality of sequential shutter operations;
        generate an image using the set of binary counts; and
        generate a second image using the second set of binary counts.

11. The system of claim 10, wherein the second set of binary counts comprises a same number of binary counts as the set of binary counts.

12. The system of claim 10, wherein the respective streams of binary counts are accumulated on a system-on-a-chip (SOC) of the system.

13. The system of claim 10, wherein the instructions are executable by the one or more processors to further configure the system to apply a motion compensation operation to generate the image.

14. A method for image acquisition with reduced noise using a single photon avalanche diode (SPAD) array, comprising:
- performing a plurality of sequential exposure and readout operations, each exposure and readout operation comprising:
  - applying a set of shutter operations to configure each SPAD pixel of a SPAD array to enable photon detection; and
  - for each SPAD pixel of the SPAD array, reading out a number of photons detected during the set of shutter operations;
- determine consecutive pluralities of sequential exposure and readout operations from the plurality of sequential exposure and readout operations, wherein the consecutive pluralities of sequential exposure and readout operations comprise at least partially overlapping sets of sequential exposure and readout operations from the plurality of sequential exposure and readout operations; and
- generating consecutive images using the consecutive pluralities of sequential exposure and readout operations, wherein each consecutive image is generated based on the number of photons detected for each SPAD pixel during a respective consecutive plurality of sequential exposure and readout operations of the consecutive pluralities of sequential exposure and readout operations.

* * * * *